United States Patent [19]
Murakami et al.

[11] Patent Number: 5,853,660
[45] Date of Patent: Dec. 29, 1998

[54] ROLLING BEARING MADE OF IMPROVED BEARING STEEL

[75] Inventors: Yasuo Murakami; Nobuaki Mitamura; Seiji Sato, all of Kanagawa, Japan

[73] Assignee: NSK Ltd., Tokyo, Japan

[21] Appl. No.: 542,828

[22] Filed: Oct. 13, 1995

[30] Foreign Application Priority Data

Oct. 14, 1994 [JP] Japan .................................. 6-249508

[51] Int. Cl.$^6$ .................................................. C22C 38/18
[52] U.S. Cl. ........................................... 420/104; 148/906
[58] Field of Search .............................. 420/104; 148/906

[56] References Cited

FOREIGN PATENT DOCUMENTS

| | | |
|---|---|---|
| 0301228 | 2/1989 | European Pat. Off. . |
| 3335224 | 5/1985 | Germany ................. 420/104 |
| WO92/08817 | 5/1992 | Japan . |
| 389984 | 3/1933 | United Kingdom . |
| 2161831 | 1/1986 | United Kingdom . |
| 2164057 | 3/1986 | United Kingdom . |
| 2155951 | 10/1995 | United Kingdom . |
| 2294058 | 4/1996 | United Kingdom . |

*Primary Examiner*—Deborah Yee
*Attorney, Agent, or Firm*—Sughrue, Mion, Zinn, Macpeak & Seas, PLLC

[57] ABSTRACT

A bearing steel includes 0.70 to 0.93 wt % of C, 0.15 to 0.50 wt % of Si, 0.50 to 1.10 wt % of Mn and 0.3 to 0.65 wt % of Cr, with the balance being Fe and incidental impurities, and it has the ratio Cr/C specified to fall within 0.4 to 0.7. Because of these compositional features, the generation of macro carbides is prevented and the need to perform soaking at high temperature for a prolonged time is eliminated. Further, the bearing steel saves the materials cost and the overall cost of heat treatments in the manufacture of bearings and which yet is capable of satisfying the requirements of various characteristics of bearings, as well as a rolling bearing that employs the bearing steel.

2 Claims, 1 Drawing Sheet

ROLLING BEARING MADE OF IMPROVED BEARING STEEL

BACKGROUND OF THE INVENTION

The present invention relates to a rolling bearing made of bearing steel which is characterized in that soaking at high temperature for a prolonged time is eliminated by preventing the generation of macro carbides during ingot casting, and which is sufficient only to be subjected to a simplified spheroidizing treatment for obtaining superior workability (machinability) and long life.

Rolling elements and inner and outer races which are components of rolling bearings are conventionally made of through-hardening bearing steels such as SUJ2 and SUJ3 or case-hardening steels such as SCr420 and SCM420.

However, the conventional steels involve the following problems. High-carbon chromium steels used as the bearing steels such as SUJ2 and SUJ3 must be subjected to soaking at a high temperature of 1,200° C. for a total process time of 20 hours, for the purpose of eliminating the macro carbides and segregation which occur during ingot casting to thereby form a homogeneous structure. In addition, a prolonged heat treatment is necessary to spheroidize the carbides after a rolling process. Accordingly, these cause a higher production cost of steel materials.

On the other hand, the case-hardening steels are low in the carbon concentration of the raw material, so that no macro carbides are produced. Hence, they require neither the soaking at elevated temperature nor the prolonged heat treatment which is performed to spheroidize the carbides after the rolling process. However, in order to harden the surface layer in the case-hardening steels, carburization or carbonitriding must be performed as an alternative heat treatment for a prolonged time. As a result, the heat treatment cost for manufacturing bearings is high as a whole.

Essentially, the bearings are machine elements which support rotating shafts under high load, so that the bearings are required to have various characteristics such as high rigidity and high resistances to rolling fatigue, wear and creep. To fulfill these requirements and yet reduce the production cost causes a limit design of raw materials but it is an extremely objective to attain.

SUMMARY OF THE INVENTION

The present invention has been accomplished under conventional circumstances and has an object of providing a bearing steel which can reduce not only the materials cost but also the overall heat treatment cost for manufacturing bearings and which yet can satisfy the requirements of various bearing's characteristics. In addition, the present invention has another object of providing a rolling bearing made of the bearing steel.

The object of the present invention can be attained by a bearing steel which includes 0.70 to 0.93 wt % of C, 0.15 to 0.50 wt % of Si, 0.50 to 1.10 wt % of Mn and 0.3 to 0.65 wt % of Cr, with the balance being Fe, and which satisfies a relationship of $0.4 \leq Cr/C \leq 0.7$. Further, the other object of the present invention can be attained by a rolling bearing including component parts of an inner race, an outer race and a plurality of rolling elements, at least one of the component parts being made of the bearing steel.

The bearing steel can be used to fabricate a long-lived rolling bearing with high workability (machinability) in that the bearing includes at least an inner race, an outer race and rolling elements.

DETAILED DESCRIPTION OF THE INVENTION

Figure 1:
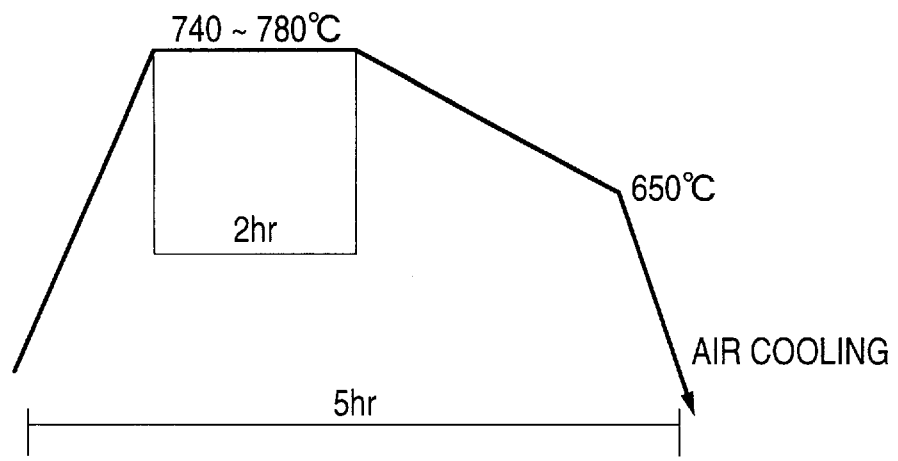
FIG. 1 is a diagram illustrating the process of spheroidizing test specimens according to a simplified treatment of the present invention.

The present inventors conducted intensive studies on optimal materials and heat treatments with due regard to cost considerations. As a result, the present inventors have found the following results: if the C and Cr contents of a high-carbon chromium steel and its Cr/C ratio fall within specified ranges together with the Mn content, it can eliminate the soaking process which has to be performed at high temperature for a prolonged time in order to eliminate macro carbides; and in addition, it can simplify the spheroidizing process which has to be performed for a prolonged time in order to spheroidize carbides. Accordingly, using the steel as a raw material, rolling bearings can be manufactured at minimum materials and processing costs so that the bearing has long life and high workability even in a severe environment as under lubrication in the presence of foreign matter. The present invention has been accomplished on the basis of these findings.

The criticality of the numerical limitations adopted in the present invention will now be discussed in detail.

First, the reasons for specifying the compositional ranges of the alloying components in the bearing steel of the present invention will be described.

C: 0.7–0.93 wt %

The bearing steel of the present invention is not subjected to a prolonged heat treatment such as carburization or carbonitriding but is subjected to similar heat treatments to those performed for high-carbon chromium steels such as SUJ2 and SUJ3, namely, preheating in a reducing atmosphere, followed by hardening at 820° to 860° C. and tempering at the low temperature of about 160 ° to 200° C. Accordingly, the objective of the present invention is to insure a Rockwell C hardness of at least $H_RC$ 60 which is the value required for bearings only by performing the similar heat treatments. Therefore, the C content of the bearing steel of the present invention must be at least 0.7 wt %. Conventionally, it has been held that $H_RC$ 60 and more can be attained even if the C content is less than 0.7 wt %, so that there has been a case in which the C content is deliberately reduced to less than 0.7 wt % in order to improve the cold workability of the steel. However, the decreasing of the C content causes the resisting property for tempering to reduce remarkably. If the C content becomes below 0.7 wt %, it is impossible to assure $H_RC$ 60 and more consistently through tempering at the low temperature of 160 to 200° C.

The other objective of the present invention is to enable the production of the rolling bearings from the bearing steel at a lower cost by eliminating the soaking process and simplifying the spheroidizing process. To eliminate the soaking process, the upper limit of the C content must be set to 0.93 wt % in consideration of its relationship with other alloying elements (in particular, Cr). If the C content of the raw material exceeds 0.93 wt %, the soaking process becomes necessary to eliminate macro carbides and segregation in the steelmaking process, so that the production cost of the raw material increases.

For these reasons, the C content of the bearing steel of the present invention is specified to fall within 0.7 wt % to 0.93 wt %.

Si: 0.15–0.50 wt %

Silicon acts as a deoxidizer in the steelmaking process, thereby improving its hardenability and strengthening the matrix martensite; thus, silicon is an element which is effective for extending the life of bearing's components including not only the rolling elements but also the inner and outer races. The life-extending effect of silicon is exhibited if its content is at least 0.15 wt % and up to about 1.2 wt %. On the other hand, the workability of the steel in various aspects such as machinability, forgeability and cold workability deteriorates as the Si content increases. Hence, to insure workability comparable to that of SUJ2, the upper limit of the Si content is set to 0.5 wt %. In respect of its lower limit, hardenability is difficult to assure if the Si content is less than 0.15 wt %.

For these reasons, the Si content of the bearing steel of the present invention is specified to fall within 0.15 wt % to 0.50 wt %.

Mn: 0.50–1.10 wt %

Manganese is added for the purpose of adjusting hardenability and assuring the necessary amount of retained austenite. Bearings for automotive transmissions are typically used under lubrication in the presence of foreign matter. It is becoming clear that increasing the amount of retained austenite ($\gamma_R$) in the bearing steel as a raw material is effective for extending the life of the bearings under such a severe environment of use (U.S. Pat. No. 4,904,094).

Hence, the bearing steel of the present invention is specified to have a minimum Mn content of 0.50 wt % that is necessary to insure the degree of hardenability and the amount of retained austenite (e.g. $\gamma_R$=12–17 vol %) that are at least comparable to those of SUJ2.

On the other hand, Mn is an element that strengthens the ferrite in the steel and its cold workability deteriorates considerably if the Mn content increases. Therefore, the upper limit of the Mn content is set to 1.1 wt %.

For these reasons, the Mn content of the bearing steel for the rolling bearing of the present invention is specified to fall within 0.50 wt % to 1.10 wt %.

Cr: 0.3–0.65 wt %

Chromium is an element that acts effectively in improving various properties of steels such as hardenability, resisting property for temper softening and wear resistance. To insure these effects, Cr must be incorporated in an amount of at least 0.3 wt %. On the other hand, Cr also acts as a carbide-forming element depending on the C content. If the Cr content exceeds 0.65 wt %, macro carbides are formed during the steelmaking process and to eliminate them, soaking must be performed at high temperature for a prolonged time, resulting in a higher production cost. To avoid this problem, the upper limit of the Cr content is set to 0.65 wt %.

For these reasons, the Cr content of the bearing steel for the rolling bearing of the present invention is specified to fall within 0.3 wt % to 0.65 wt %.

Cr/C: 0.4–0.7

When a molten steel solidifies in the casting process, the solutes of C and Cr thicken in the area of central segregation to generate eutectic carbides. To avoid this problem, the upper limit of Cr/C ratio must be set as a critical value.

According to the binary phase diagram of Fe—C system, the theoretical threshold C content for the generation of the eutectic carbides is 1.7 wt %. Analyses have revealed that as a molten steel solidifies, carbon thickens to reach a concentration almost 1.8 times the content in the parent phase of the steel material (the area other than the central segregation). Hence, the upper limit of the C content of the parent phase is calculated to be 0.944 wt % (the threshold 1.7 wt %/1.8). On the other hand, Cr must be added in order to extend the bearing's life by increasing not only the resisting property for temper softening but also the hardness of the steel through the strengthening of the matrix by dissolved C and Cr. This addition of Cr allows carbon to be incorporated into chromium carbides being formed, whereupon the threshold C content for the generation of the eutectic carbides shifts to a lower value than the stated 1.7 wt %. Allowing for this shift, the upper limit of the C content in the parent phase is set to 0.93 wt %. The upper limit of the Cr content is 0.65 wt % (see above). Based on these limits, the upper limit of the ratio (Cr/C) of chromium to carbon is specified to be 0.7 (=0.65/0.93).

On the other hand, the lower limit of Cr/C is set to 0.4.

As already mentioned, in order to extend the bearing's life by increasing not only the resisting property for temper softening but also the hardness of the steel through the strengthening of the matrix by dissolved C and Cr, a minimum value of Cr/C must be set to 0.4.

P, S$\leq$0.025 wt %

Phosphorus and sulfur are impurity elements in bearing steels and deteriorate their mechanical properties. Therefore, an ideal bearing steel should preferably have the lowest contents of P and S. However, to reduce the P and S contents to extremes, sophisticated refining facilities and very long refining periods are necessary, so that this again results in a higher production cost.

Accordingly, the upper limit of each of the P and S contents is so set as to satisfy the regulations on cleanliness (JIS G4805) while allowing for slight deterioration in the mechanical properties of the steel as a bearing material.

Ti$\leq$40 ppm; O$\leq$15 ppm

Titanium and oxygen are non-metallic inclusion forming elements which are harmful to the fatigue characteristics of rolling bearings. Highly clean steels that are reduced in the contents of these elements and which hence are suitable for the purpose of extending the life of bearings are already known. However, to reduce these elements, special considerations are necessary such as careful choice of raw materials and strict management of ladles and this only adds to the production cost.

Accordingly, the present inventors noted the effect the Ti and O contents of the bearing steel would have on the bearing's life and specified the upper limits of the contents of the respective elements at the contents where their life extending effect was substantially saturated to realize no remarkable improvement. Hence, the Ti content is preferably no more than 40 ppm and the O content no more than 15 ppm.

EXAMPLES

Examples of the present invention will now be described.

(1) Preparation of test pieces (specimens):

Specimens of sample Nos. 1–13 having the compositional formulas shown in Table 1 were prepared by melting in a 100-kg vacuum induction heating furnace. No soaking was performed for samples Nos. 1–13. The ingots were forged into steel bars (65 mm$\phi$), which were subjected to a preliminary treatment by the simplified spheroidizing treatment shown in FIG. 1 and thereafter subjected to hardening and tempering according to the treatment shown in FIG. 2.

TABLE 1

|  |  | C (wt %) | Si (wt %) | Mn (wt %) | Cr (wt %) | Cr/C |
|---|---|---|---|---|---|---|
| Invention | 1 | 0.93 | 0.49 | 1.10 | 0.63 | 0.68 |
|  | 2 | 0.71 | 0.17 | 0.50 | 0.31 | 0.44 |
|  | 3 | 0.82 | 0.33 | 0.84 | 0.45 | 0.55 |
| Comparison | 4 | 0.96 | 0.33 | 0.85 | 0.43 | 0.45 |
|  | 5 | 0.67 | 0.34 | 0.85 | 0.44 | 0.66 |
|  | 6 | 0.83 | 0.55 | 0.84 | 0.44 | 0.53 |
|  | 7 | 0.82 | 0.13 | 0.86 | 0.43 | 0.52 |
|  | 8 | 0.82 | 0.35 | 1.14 | 0.44 | 0.54 |
|  | 9 | 0.84 | 0.34 | 0.45 | 0.42 | 0.50 |
|  | 10 | 0.81 | 0.34 | 0.83 | 0.68 | 0.83 |
|  | 11 | 0.83 | 0.34 | 0.84 | 0.26 | 0.31 |
|  | 12 | 0.83 | 0.35 | 0.84 | 0.61 | 0.73 |
|  | 13 | 0.86 | 0.34 | 0.84 | 0.32 | 0.37 |
|  | 14 | 1.02 | 0.25 | 0.34 | 1.45 | 1.42 |

Sample Nos. 1 to 3 in Table 1 were bearing steels within the scope of the invention. Sample Nos. 4 to 13 were comparative examples with the ingredients outside the scope of the present invention being identified by underlined numerals. Sample No. 14 was a standard mass-produced steel (SUJ2) that had been subjected to normal soaking and spheroidizing treatments. In all samples, each of the impurity elements P and S was present in an amount of no more than 0.025 wt %, and the Ti and O contents were no more than 40 ppm and 15 ppm, respectively.

(2) Tests to evaluate the machinability of the specimens and their life under lubrication in the presence of foreign matter:

The specimens of sample Nos. 1 to 14 were subjected to two tests, one for evaluating their machinability and the other for estimating their life. The pieces for the life tests were disk-shaped and those for evaluating machinability were cylindrical in shape.

The life tests were conducted with a thrust type test machine that was described on chap. 10, page 21 of "Tokushuko Binran (Handbook of Specialty Steels)", First Ed., edited by Electrosteelmaking Research Institute, published by Rikogakusha, May 25, 1969.

Test conditions

Contact pressure: 500 kg/mm$^2$ max

Rotating speed: 1,000 rpm

Lubricant: No. 68 turbine oil

Foreign matter added: Particles (hardness Hv, 540; size, 74 to 147 μm) were added to the lubricant in an amount of 300 ppm.

The number of test runs for the respective specimens was from 8 to 10 and the duration of life was evaluated in terms of $L_{10}$ life. The results of the life tests are shown in Table 2.

Figure 2:
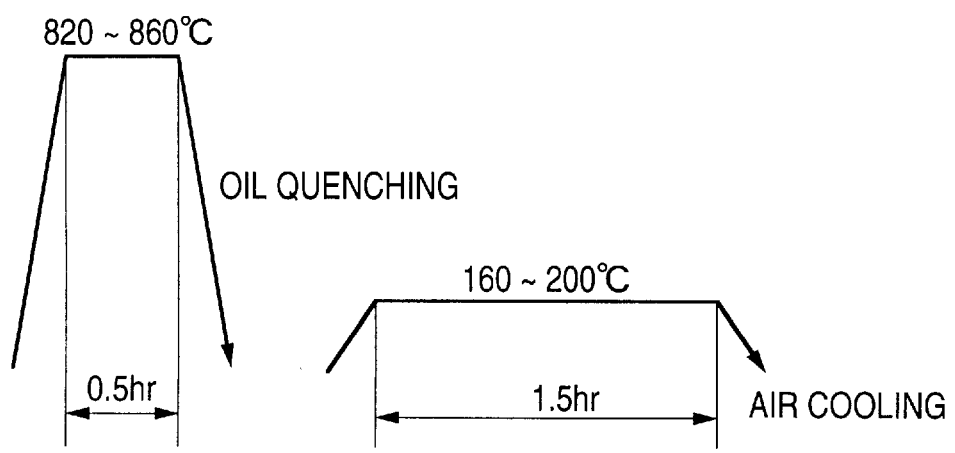
FIG. 2 is a diagram illustrating the process of hardening and tempering the test specimens according to the present invention.

The tests for evaluating machinability were conducted on sample Nos. 1 to 13 using test pieces that had been subjected to a simplified spheroidizing treatment shown in FIG. 1. For the standard steel sample No 14, the tests were conducted using test pieces that had been subjected to soaking, and then a normal spheroidizing treatment which took quite a longer time compared with the simplified spheroidizing treatment as shown in FIG. 1.

Test conditions

Cutting speed: 200 m/min

Depth of cut: 1 mm

Feed: 0.25 mm/rev

The specimens were cut under the indicated conditions and their machinability was evaluated by the time required for the cutting tool to wear on the flank by 0.2 mm. The results of the machinability test are also shown in Table 2 together with the measured data of hardness that developed after hardening and tempering the spheroidized specimens of sample Nos. 1 to 14.

TABLE 2

|  |  | Hardness after hardening and tempering ($H_RC$) | Bearing's life under lubrication in the presence of added foreign matter ($\times 10^6$ cycles) | Time to flank wear of 0.2 mm (min) |
|---|---|---|---|---|
| Invention | 1 | 61.7 | 3.7 | 11 |
|  | 2 | 60.6 | 3.5 | 14 |
|  | 3 | 61.6 | 4.2 | 15 |
| Comparison | 4 | 62.0 | 2.5 | 10 |
|  | 5 | 59.5 | 0.8 | 16 |
|  | 6 | 60.9 | 3.6 | 3 |
|  | 7 | 60.3 | 1.1 | 15 |
|  | 8 | 60.9 | 3.4 | 4 |
|  | 9 | 60.1 | 1.0 | 13 |
|  | 10 | 61.0 | 2.0 | 6 |
|  | 11 | 60.8 | 1.8 | 9 |
|  | 12 | 61.5 | 2.1 | 7 |
|  | 13 | 60.9 | 2.2 | 10 |
|  | 14 | 62.5 | 3.4 | 10 |

Sample Nos. 1 to 3 which were bearing steels within the scope of the present invention had hardness exceeding $H_RC$ 60 after hardening and tempering and their performance was more than comparable to the standard steel of sample No. 14 in terms of both life and machinability.

The comparative samples, on the other hand, had the following characteristics.

Sample No. 4 containing more than 0.93 wt % of C had an unduly short life.

Sample No. 5 containing less than 0.70 wt % of C was unable to insure $H_RC$ 60 after hardening and tempering and its life was very short.

Sample No. 6 containing more than 0.50 wt % of Si had a comparable life to the standard steel of sample No. 14 but its machinability was very low.

Sample No. 7 containing less than 0.15 wt % of Si had an unduly short life.

Sample No. 8 containing more than 1.10 wt % of Mn had a comparable life to the standard steel of sample No. 14 but its machinability was very low.

Sample No. 9 containing less than 0.50 wt % of Mn had an unduly short life.

Sample No. 10 containing more than 0.65 wt % of Cr with Cr/C being greater than 0.7 had a short life and low machinability on account of the generation of macro carbides.

Sample No. 11 containing less than 0.3 wt % of Cr with Cr/C being less than 0.4 had an unduly short life.

Sample No. 12, with the Cr/C value being in excess of 0.7 had a short life and low machinability as in the case of sample No. 10.

Sample No. 13, with the Cr/C being less than 0.4, had an unduly short life.

Sample No. 14 was a standard mass-produced steel (SUJ2). Although it had a high C content with the Cr/C being in excess of 0.7, sample No. 14 was not affected in terms of either life or machinability. This was only because the macro carbides that generated in the steel were eliminated by soaking that took quite a long time.

On the other hand, sample Nos. 1 to 3 did not require such heat treatments (hence, rolling bearings would be fabricated from those samples at a lower processing cost than SUJ2) and yet their performance was more than comparable to sample No. 14 in terms of both life and machinability.

The concept of the present invention is applicable to various types of rolling bearings (including, for example, ball bearings, cylindrical roller bearings, conical roller bearings and spherical roller bearings, which is either of radial or thrust type).

The components of the roller bearing of the present invention are not limited to the inner and outer races and the rolling elements alone but that the bearing may also include a cage and a seal.

As described above, the bearing steel of the present invention is specified as regards the C, Cr and Si contents and the Cr/C ratio together with the Mn content and this helps prevent the formation of macro carbides during the casting of steel ingots, whereby soaking at high temperature for a prolonged time can be eliminated to realize substantial saving on the manufacturing cost of steel materials. In addition, this bearing steel can be used to fabricate a rolling bearing that has the necessary amount of retained austenite to exhibit superior workability while assuring an extended life even in a severe environment of use as under lubrication in the presence of foreign matter.

What is claimed is:

1. A rolling bearing comprising component parts of an inner race, an outer race and a plurality of rolling elements, at least one of the component parts being made of a bearing steel comprising:

0.70 to 0.93 wt % of C;

0.15 to 0.50 wt % of Si;

0.50 to 1.10 wt % of Mn;

0.3 to 0.65 wt % of Cr; and the balance being Fe, wherein the one of the component parts satisfies a relationship of $0.4 \leq Cr/C \leq 0.7$ to thereby avoid generation of eutectic carbides.

2. The rolling bearing of claim 1, wherein the one of the component parts has a spheroidized carbide layer which is formed by being subjected to a simplified spheroidizing treatment, hardening and tempering.

* * * * *